United States Patent
Schmidt

(10) Patent No.: US 8,967,876 B2
(45) Date of Patent: Mar. 3, 2015

(54) ROLLING BEARING WITH OPTIMIZED PRESS-IN FORCE

(75) Inventor: Heiko Schmidt, Muehlhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/122,347

(22) PCT Filed: Feb. 27, 2012

(86) PCT No.: PCT/EP2012/053281
§ 371 (c)(1),
(2), (4) Date: Nov. 26, 2013

(87) PCT Pub. No.: WO2013/000590
PCT Pub. Date: Jan. 3, 2013

(65) Prior Publication Data
US 2014/0126851 A1    May 8, 2014

(30) Foreign Application Priority Data
Jun. 30, 2011 (DE) .......................... 10 2011 078 427

(51) Int. Cl.
| F16C 33/60 | (2006.01) |
| F16C 43/00 | (2006.01) |
| F16C 33/58 | (2006.01) |
| F01D 25/16 | (2006.01) |
| F16C 35/063 | (2006.01) |
| F16C 19/18 | (2006.01) |

(52) U.S. Cl.
CPC .............. *F16C 33/586* (2013.01); *F01D 25/16* (2013.01); *F16C 35/063* (2013.01); *F16C 19/184* (2013.01); *F16C 2226/12* (2013.01); *F16C 2360/24* (2013.01); *F05D 2220/40* (2013.01)
USPC .......... 384/504; 384/506; 384/537; 29/898.07

(58) Field of Classification Search
CPC .............................. F16C 33/60; F16C 2360/24
USPC ........ 384/499, 504–506, 512, 517; 29/898.07
See application file for complete search history.

(56) References Cited

U.S. PATENT DOCUMENTS

| 5,055,009 A * | 10/1991 | Gutknecht .................... 417/407 |
| 2005/0286819 A1 | 12/2005 | Mavrosakis |
| 2011/0158803 A1 | 6/2011 | Sebald et al. |

FOREIGN PATENT DOCUMENTS

| DE | 10 2008 020 067 | 10/2009 |
| DE | 10 2009 048511 | 4/2011 |
| EP | 504138 B1 * | 9/1994 |
| WO | WO 2006/004654 | 1/2006 |

* cited by examiner

*Primary Examiner* — Phillip A Johnson
(74) *Attorney, Agent, or Firm* — Davidson, Davidson & Kappel, LLC

(57) ABSTRACT

A rolling contact bearing includes a shaft having a first radial elevation and a second radial elevation. A first inner ring has a first raceway for the rolling bodies to roll on, a first radial narrowing and a second radial narrowing, the first radial elevation and the first radial narrowing forming a first press fit, and, respectively, the second radial elevation and the second radial narrowing forming a second press fit. The shaft has a third radial elevation and a fourth radial elevation. A second inner ring has a second, radially outer rolling body raceway for rolling bodies to roll on, a third radial narrowing and a fourth radial narrowing, wherein the third radial elevation and the third radial narrowing forming a third press fit and, respectively, the fourth radial elevation and the fourth radial narrowing forming a fourth press fit.

11 Claims, 4 Drawing Sheets of the raceways arranged concentric to the shaft. Subsequently, the first inner ring is fixed in place by means of the first press fit.

ROLLING BEARING WITH OPTIMIZED PRESS-IN FORCE

The invention concerns a rolling bearing particularly a turbocharger rolling bearing, comprising a shaft comprising a first, radial elevation and a second, radial elevation and a first, inner ring which can be fixed to the shaft, said first inner ring comprising at least one first radially outer rolling element raceway for rolling elements to roll on, a first, radial narrowing and a second, radial narrowing, the first, radial elevation and the first, radial narrowing being provided for forming a first press fit, and, respectively, the second, radial elevation and the second, radial narrowing being provided for forming a second press fit.

BACKGROUND

DE 10 2008 020 067 A1 discloses a turbocharger bearing which comprises a shaft comprising different outer diameters onto which shaft the one-piece inner ring is pushed. Axially on the outer side, the inner ring is seated on the shaft through a press fit, while, centrally, under the inner ring is situated a smaller outer diameter without press fit so that a low frictional force is produced during pressing in.

SUMMARY OF THE INVENTION

The problem of this construction is that a rolling bearing comprising a two-piece inner ring cannot be adequately centered on a shaft of this type because the inner rings, or the inner ring parts, are seated only on axially outer sides on the shaft. However, at high speeds of rotation, it is exactly an optimal centering that is of vital importance for the life duration of the rolling bearing.

It is an object of the present invention to provide a shaft permitting an optimized press-in force for rolling bearings comprising two inner rings, which shaft also enables the required centering.

The present invention provides a rolling bearing of the initially described type by the fact that the shaft comprises a third, radial elevation and a fourth, radial elevation, and a second inner ring that can be fixed to the shaft comprises at least one second, radially outer rolling element raceway for the rolling elements to roll on, a third, radial narrowing and a fourth, radial narrowing, the third, radial elevation and the third, radial narrowing being provided for forming a third press fit, and, respectively, the fourth, radial elevation and the fourth, radial narrowing being provided for forming a fourth press fit.

By press fit is to be understood a radial interference fit in which the inner diameter of a hollow cylindrical part is substantially equal to or smaller than the associated outer diameter of the pressed-in cylindrical part. In no case may a lash freedom be formed or positioning steps be permitted that allow a non-concentric arrangement of the respect inner ring relative to the shaft. For example, not even a negative lash in the range of less than 5 micrometers, particularly, 1 or 2 micrometers, may be tolerated between the narrowing and the corresponding elevation for achieving a reliable centering. Although this type of fit is occasionally called a transition fit, it is also to be understood as a press fit in the following. The pressed-in cylindrical part in the sense of the present invention is the first, second, third or fourth elevation of the shaft, and the hollow cylindrical part is the first, second, third or fourth radial narrowing of one of the inner rings.

The radial narrowings are arranged on the inner side of the inner rings and are configured on these. Therefore, they are narrowings that are situated radially on the inside.

Altogether, four press fits are implemented, each inner ring comprising two press fits on which the respective inner ring is supported.

It is also possible to provide a temporary press fit during assembly. A temporary press fit is created if two neighboring radial narrowings have the same diameter. In this case, during assembly, that is to say, when the shaft is being inserted into the inner rings, one of the radial elevations must be pushed through the temporary press fit of a radial narrowing to then form a permanent (and thus operable) press fit with a neighboring radial narrowing.

According to the invention, the lever action between the two press fits of the respective the inner ring effects the centering of the inner rings on the shaft required for the operation of the rolling bearing. This is possible because one of the two press fits serves as a fulcrum and the other as an actuator of the lever.

Advantageously, the first outer diameter of the first, radial elevation is smaller than or equal to the second outer diameter of the second, radial elevation, the second outer diameter of the second, radial elevation is smaller than or equal to the third outer diameter of the third, radial elevation and the third outer diameter of the third, radial elevation is smaller than or equal to the fourth outer diameter of the fourth, radial elevation. The dimension of the outer diameters can be varied depending on the case of use.

If temporary press fits are to be avoided, it is purposeful to provide an ascending sequence of outer diameters for the radial elevations that get smaller in insertion direction, i.e. in this case, the first radial elevation, with the smallest outer diameter, is inserted at first.

According to the invention, the first and the third press fit form a fulcrum before the second and the fourth press fit, respectively, are formed. During the formation of the second and fourth press fit respectively, the inner ring concerned is oriented such that it is arranged concentric to the shaft. This is accomplished with a low force because the lever arms between the first and the second press fit, as also between the third and the fourth press fit, can be chosen to be long enough to enable any radial positioning still required at the second and, respectively, the fourth press fit.

It is further purposeful to center the second inner ring later in time than the first inner ring. During the centering step, the lever arm of the respective inner ring works against the frictional force that is produced on a contact surface to the next-situated component. If the second inner ring were centered at first, frictional forces would be created on both sides of the first inner ring, that is to say, also in direction towards the second inner ring.

It is particularly preferred to realize the first press fit as a fulcrum for the first inner ring. Following this, the second press fit of the first inner ring is made in order to arrange the first inner ring concentrically to the shaft through a radial correction at the second press fit. The third press fit then likewise takes over the function of a fulcrum so that it can be used in the then following realization of the fourth press fit as a fulcrum during the radial orientation.

Advantageously, the first outer diameter and the second outer diameter are equal to each other. This simplifies the production of the first inner ring. The first inner ring is at first centered i.e. it is brought into as concentric a position as possible to the shaft in that the second press fit is situated on that axial side of the first inner ring on which the shaft is inserted at first.

Advantageously, the third outer diameter and the fourth outer diameter are equal to each other. This simplifies the production of the second inner ring in a corresponding manner.

In an advantageous form of embodiment, the shaft has a multi-piece configuration in the region of the press fits. For instance, it is not necessary to make the shaft with all its elevations by turning out of one work piece. Instead, it is possible to fix rings on the shaft that form the radial elevations.

Preferably, the shaft merges, in the region of the first, second, third and/or fourth radial elevation, beginning from the first, second, third and/or, respectively, fourth outer diameter, in one axial direction, with a linear, concave or convex shape into a further region with a further outer diameter, the further outer diameter being respectively smaller than the first, second, third and fourth outer diameter. This thread-in aid assists in the insertion of the shaft during assembly so that the press-in force required is reduced further. Thus, the outer region of the shaft that carries the respective linear, concave or convex transition separates the elevations from the non-carrying outer regions. An outer region in this case can be, for example, a cylindrical outer surface of the shaft.

The simplest manner of configuring the transitions is to make them as linear assembly inclinations which preferably form an angle of between 5 and 30 degrees to the axis of rotation, ideally 15 or 25 degrees. In this way, the axial force of the shaft to be inserted can be converted easily into a small radial force for correction of positions.

Preferably, the respective first or second inner ring merges in the region of the first, second, third and/or fourth radial narrowing, beginning from the first, second, third and, respectively, fourth inner diameter, in one axial direction, with a linear, concave or convex shape into a region with a further inner diameter that is respectively larger than the first, second, third and fourth inner diameter. Thus, the respective linear, concave or convex transition separates an outer region that carries the respective inner ring from a non-carrying outer region of the shaft.

In the case of these transitions, too, the simplest manner of configuring them is to make them as linear assembly inclinations which preferably form an angle of between 5 and 30 degrees to the axis of rotation, ideally 15 or 25 degrees.

Advantageously, a first axial distance of the first press fit from the second press fit is larger than half the axial width of the first inner ring and/or a second axial distance of the third press fit from the fourth press fit is larger than half the axial width of the second inner ring. In this way, the respective lever arm between the press fits is enlarged and the press-in force is reduced still further.

Advantageously, the second press fit is arranged on one axial end of the first inner ring and/or the third press fit is arranged on one end of the second inner ring.

In one advantageous form of embodiment, the shaft can be inserted into the inner rings, arranged axially relative to each other, till one axial front end of the second inner ring comes to abut against a turbine-side axial stop and thus signalizes the operable position of the shaft within the inner rings. In this way, the installer can be sure that, when the two surfaces contact each other, all the press fits required for centering have been completed and the centering of the two rings has been terminated.

Further advantageous embodiments and preferred further developments of the invention can be seen in the description of the figures and/or in the dependent claims.

BRIEF DESCRIPTION OF THE DRAWINGS

The invention will be described and explained more closely in the following with reference to the examples of embodiment illustrated in the figures.

DETAILED DESCRIPTION

Figure 1:
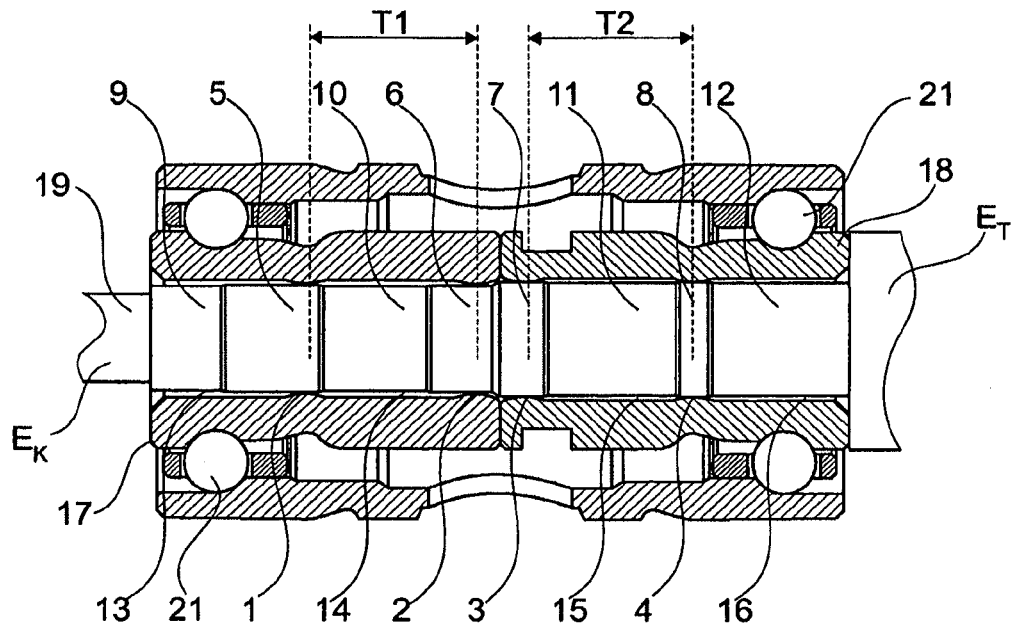
FIG. 1 shows a turbocharger rolling bearing in a section taken along the shaft, in ready-assembled, operative state.

FIG. 1 shows a turbocharger rolling bearing in a section taken along the shaft in an operative state after installation.

The fractional part of the shaft 19 which is surrounded by both the inner rings 17, 18 merges on a turbine-side into the turbine-side end ET which is either itself a part of the turbocharger turbine or is configured to be connected to this. On the opposite end of the fractional part of the shaft 19, the fractional part merges with the compressor-side end EK of the fractional part which can be a part of the compressor or be capable of being connected to this. The compressor (not illustrated) has the function of compressing the air sucked in by the piston of an engine. The energy required for this is delivered by a turbine (likewise not illustrated) which is driven in a hot housing by the exhaust gas stream and is transferred via the shaft 19 and also via the fractional part thereof in the turbocharger bearing.

The fractional part comprises, in alternating order, from the compressor-side end EK to the turbine-side end ET, non-contacting regions and radial elevations in the following sequence: non contacting region 9, first radial elevation 5, non-contacting region 10, second radial elevation 6, third radial elevation 7, non-contacting region 11, fourth radial elevation 8 and non-contacting region 12.

All the transitions are radially convex in shape and serve as assembly inclinations that form an angle of less than 30 degrees relative to the axis of rotation. This applies both to the transition between the first and the second radial elevation 6, 7 and to the transitions between a non-contacting region 9, 10, 11, 12 and the respective neighboring radial elevation 5, 6, 7, 8.

In this way, the first elevation 5 and the radial narrowing 1 form the first operative press fit exactly as also the second elevation 6 and the second narrowing 2 form the second press fit. Both press fits again form the base for the first inner ring 17 and assure its radial centering for an operation at very high speeds of rotation without any detrimental effect on the rolling elements 21 during their rolling motion in their raceways around the inner ring 17 so that they can no longer trigger a disturbing vibration. Analogously, this also applies to the inner ring 18 that is centered through the third and the fourth press fits.

The centering of the shaft 19 is realized during installation by the fact that the compressor-side end EK is inserted through the second inner ring 18 and then further through the first inner ring 17. During this step, it is also possible for the temporary press fits to be formed before the operative position of the shaft 19 in the inner rings 17, 18 is reached. The further the first press fit is arranged from the second press fit, respectively, the third press fit from the fourth press fit, the larger is the lever arm during radial centering so that centering can be effected with the lowest possible force. The length of the first lever arm T1 is smaller than the axial width B1 of the first inner ring 17. In most cases, however, a shorter length is required to enable a passing-by of the temporary press fits one after the other during installation, that is to say, to make it possible to pass by as few as possible at the same time. This applies analogously to the length T2 of the second lever arm between the third and the fourth press fit of the second inner ring 18. In any case, it is still purposeful to provide at least one lever arm with a length of at least half the width of the respective inner ring 17, 18:

$$T1 > \tfrac{1}{2}*B1; T2 > \tfrac{1}{2}*B2;$$

In the example of embodiment of FIG. 1, the third and the fourth press fits are situated radially further outwards than the first and the second press fits. In particular, the first and the second radial narrowings 1, 2 even have the same inner radius and, respectively, the first and the second radial elevations 5, 6 have the same outer radius. Analogously, this also applies to the radial narrowings 3, 4 and the radial elevations 7, 8 but, respectively, with larger same inner radii and larger and larger same outer radii.

In this way, only two temporary press fits get formed during assembly of the shaft 19, viz. when the first radial elevation 5 passes the second radial narrowing 2 and when the third radial elevation 7 passes the radial narrowing 3.

The assembly with the two temporary press fits is illustrated in the following FIGS. 2 to 7 which show the turbocharger rolling bearing of FIG. 1 in six different assembly steps.

FIGS. 2 to 7 show the turbocharger rolling bearing of FIG. 1 in the assembly steps one to six.

Figure 2:
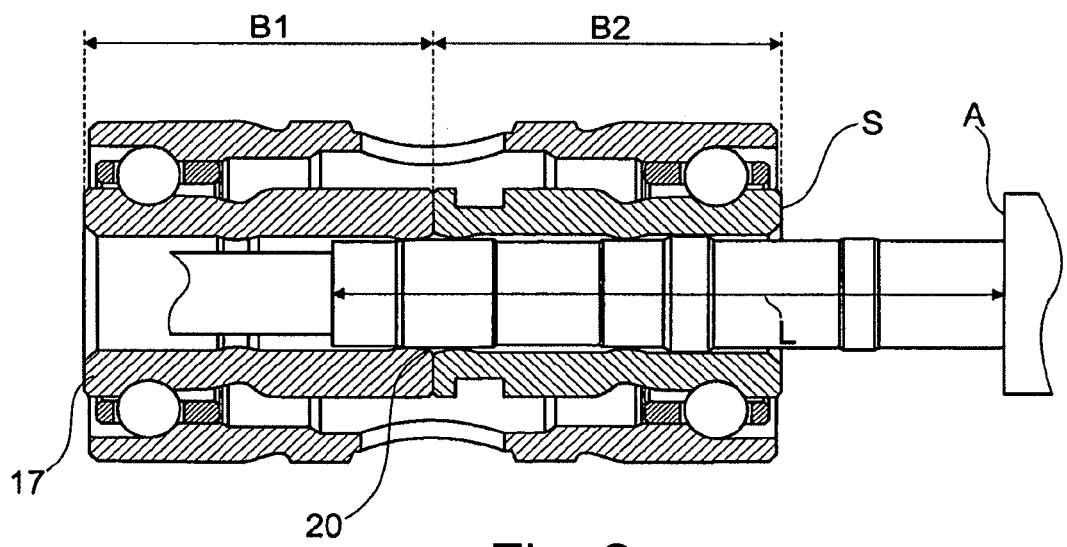
FIG. 2 shows the turbocharger rolling bearing of FIG. 1, during a first assembly step.
Figure 3:
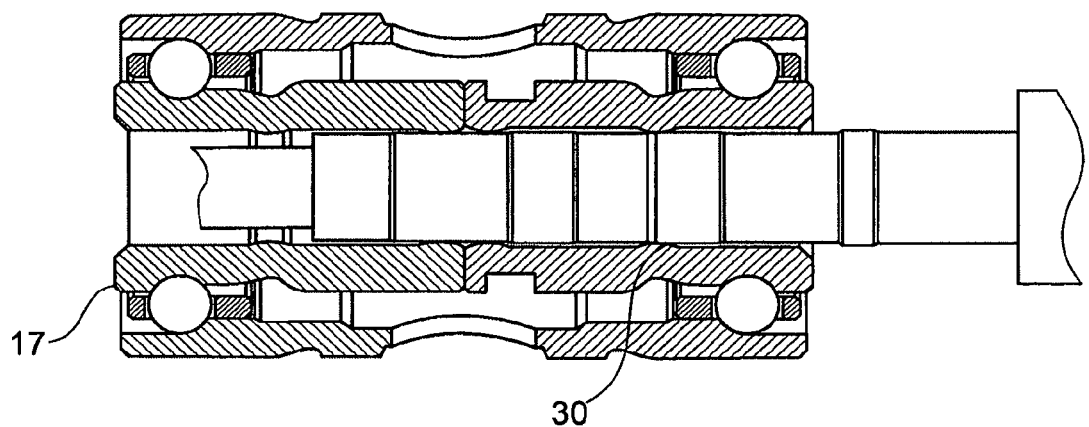
FIG. 3 shows the turbocharger rolling bearing of FIG. 1, during a second assembly step.
Figure 4:
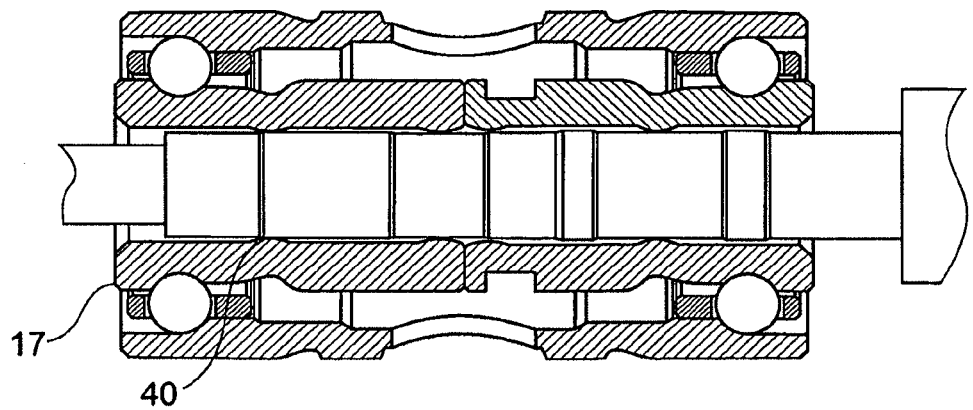
FIG. 4 shows the turbocharger rolling bearing of FIG. 1, during a third assembly step.
Figure 5:
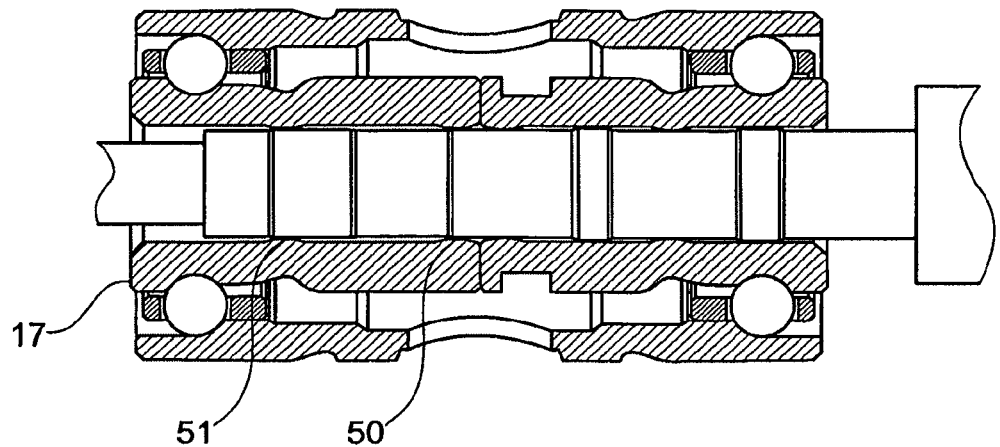
FIG. 5 shows the turbocharger rolling bearing of FIG. 1, during a fourth assembly step.
Figure 6:
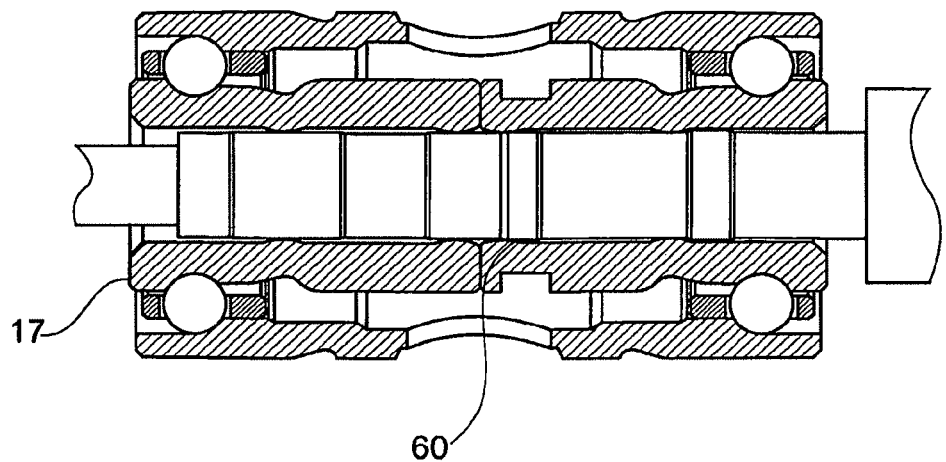
FIG. 6 shows the turbocharger rolling bearing of FIG. 1, during a fifth assembly step.
Figure 7:
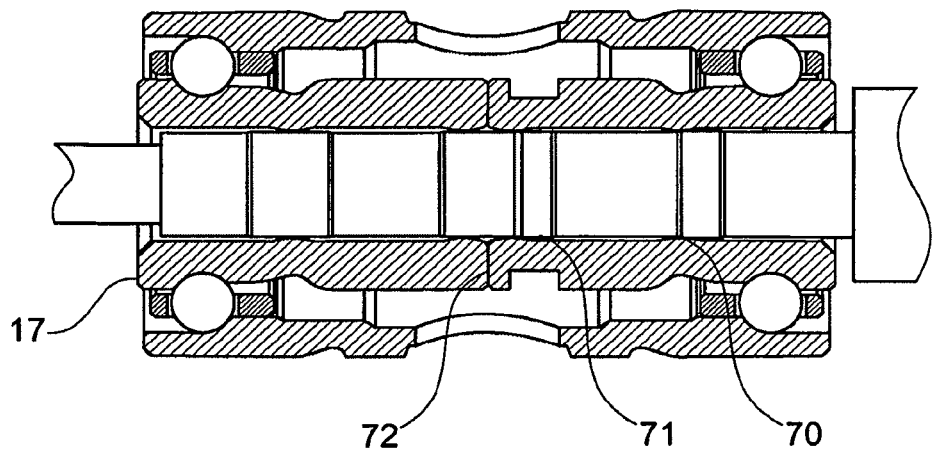
FIG. 7 shows the turbocharger rolling bearing of FIG. 1, during a sixth assembly step.

In the first assembly step of FIG. 2, the shaft 19 was pushed in between the first radial elevation 5 and the second radial narrowing 2 up to the incipient first temporary press fit 20. The press-in force is further enhanced through the second temporary press fit 30 that gets formed between the third radial elevation 7 and the fourth radial narrowing, i.e. exists partially simultaneously with the first press fit, as shown in FIG. 3.

In the following FIGS. 4 to 7, further incipient press fits, 40, 50, 60 and 70 are shown which, however, are intended to become permanent i.e. they are provided for the operation of the rolling bearing as soon as the axial front end surface S of the second inner ring comes to abut against the axial surface A.

The length L of the fractional part of the shaft 19 between the two ends EK and ET is equal to the sum of the inner ring widths B1, B2 because the two inner rings 17, 18 abut against each other at the axial stop 72.

Alternatively, the press fits can have the same dimensions i.e. the radial narrowings and the radial elevations possess the same inner radii and the same outer radii. In addition, it is also possible that all radial narrowings and also all radial elevations have different inner radii and different outer radii, so that no temporary press fits but only permanent press fits are formed.

Figure 8:
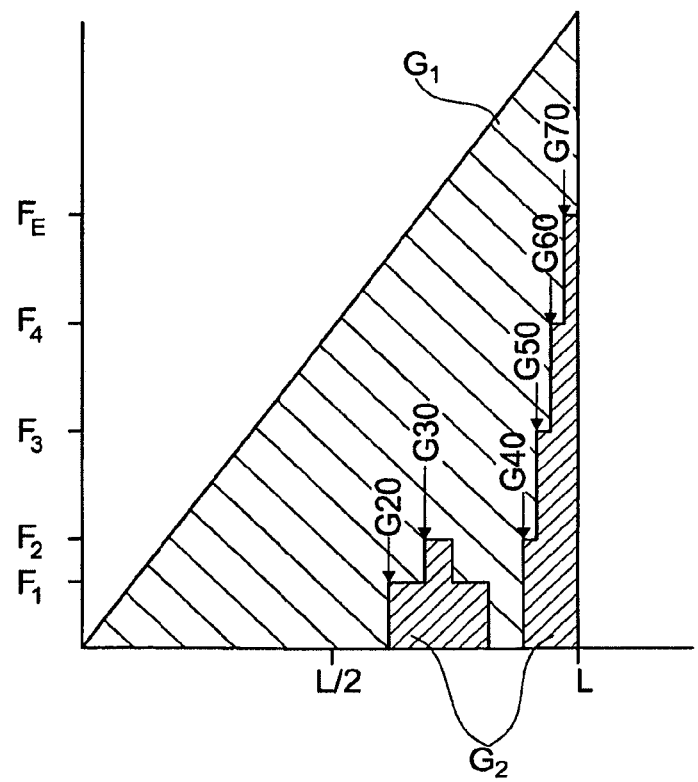
FIG. 8 shows a schematic press-in force diagram for a conventional turbocharger bearing compared to the turbocharger bearing of FIG. 1.

FIG. 8 shows a schematic press-in force diagram for a conventional turbocharger bearing compared to the turbocharger bearing of FIG. 1.

The curve G1 has a linear dependence on the press-in length that is plotted against the length from 0 to L of the fractional part of the shaft 19. The hatched area under the straight line G1 corresponds to the press-in energy for a conventional cylindrical shaft which is pressed into a hollow cylindrical interior with axially non-variable respective inner and outer radii.

The curve G2 shows schematically the course of the press-in force as a function of the press-in length, which force rises shortly after L/2, at the first temporary press fit, to F1, to then rise further immediately thereafter by reason of the second temporary press fit to F2.

For instance it can be assumed by approximation that the temporary press fits produce the same press-in force FO. Thus, the following applies:

$$F1 = F0; F2 = 2*F0; F3 = 3*F0; F4 = 4*F0;$$

Further, by idealization, it is assumed for the sake of illustration, that the areas of the press fits approximate zero. A small press fit length results in a low press-in force. In practice, however, these will always form surface contacts which, in the graphical illustration of the curve G2, form linearly ascending or, respectively, declining flanks. Idealized, these result in vertical flanks.

The curve G2 is divided into two sections. The smaller one represents the temporary press fits G20 and G30 which have to be overcome together with the press-in force FE=F2; in the case of the temporary press fit G20, the press-in force FE=F1 suffices. The hatched area situated under the curve G2 corresponds to the energy which has to be provided for overcoming the temporary press fits G20 and G30.

At the end of the press-in path are situated, at short intervals, the operative, permanent press fits, i.e. their beginnings G40, G50, G60 and G70 that have to be overcome. For this purpose, the press-in force increases stepwise from FE=0 to FE=F4. On the whole, the press-in energy of the curve G2 is clearly lower compared to the press-in energy of the curve G1 because the integral over the press-in length from 0 to L of G2 turns out to be clearly higher.

The permanent press fit 40 is the first operative press fit and the permanent press fit 50 is the second operative press fit.

To summarize, the invention concerns a rolling bearing particularly a turbocharger rolling bearing, comprising a shaft comprising a first, radial elevation and a second, radial elevation and a first inner ring which can be fixed to the shaft, said first inner ring comprising at least one first radially outer rolling element raceway for the rolling elements to roll on, a first, radial narrowing and a second, radial narrowing, the first, radial elevation and the first, radial narrowing being provided for forming a first press fit, and, respectively, the second, radial elevation and the second, radial narrowing being provided for forming a second press fit. The aim of the invention is to provide a rolling bearing with an optimized press-in force for high speeds of rotation which also enables a simple centering of two inner rings. For this purpose, the shaft comprises a third, radial elevation and a fourth, radial elevation, and a second inner ring that can be fixed to the shaft comprises at least one second, radially outer rolling element raceway for the rolling elements to roll on, a third, radial narrowing and a fourth, radial narrowing, the third, radial elevation and the third, radial narrowing being provided for forming a third press fit, and, respectively, the fourth, radial elevation and the fourth, radial narrowing being provided for forming a fourth press fit.

| | List of reference numerals | | |
|---|---|---|---|
| A | Axial stop | B1 | Axial width |
| B2 | Axial width | ET | Turbine-side end |
| EK | Compressor-side end | G1 | First curve |
| G2 | Second curve | G20 | Beginning of temporary press fit |
| G30 | Beginning of temporary press fit | G40 | Beginning of permanent press fit |
| G50 | Beginning of permanent press fit | G60 | Beginning of temporary press fit |
| G70 | Beginning of temporary press fit | F1 | Single press-in force |
| F2 | Double press-in force | F3 | Triple press-in force |
| F4 | Quadruple press-in force | FE | Press-in force |
| L | Length of fractional part of shaft | S | Axial front end |
| T1 | Axial press fit spacing | T2 | Axial press fit spacing |
| 1 | First radial narrowing | 2 | Second radial narrowing |
| 3 | Third radial narrowing | 4 | Fourth radial narrowing |
| 5 | First radial elevation | 6 | Second radial elevation |
| 7 | Third radial elevation | 8 | Fourth radial elevation |
| 9 | Non-contacting region | 10 | Non-contacting region |
| 11 | Non-contacting region | 12 | Non-contacting region |
| 13 | Non-narrowed region | 14 | Non-narrowed region |
| 15 | Non-narrowed region | 16 | Non-narrowed region |
| 17 | First inner ring | 18 | Second inner ring |
| 19 | Shaft | 20 | Temporary press fit |
| 21 | Rolling element | 30 | Temporary press fit |
| 40 | Operative press fit | 50 | Operative press fit |
| 51 | Progressive operative press fit | 60 | Operative press fit |
| 70 | Operative press fit Operative press fit | 71 | Progressive operative press fit |
| 72 | Axial stop | | |

What is claimed is:

1. A rolling bearing comprising:
a shaft including a first, radial elevation and a second, radial elevation;
a first, inner ring fixable to the shaft, the first inner ring including at least one first radially outer rolling element raceway for rolling elements to roll on, a first, radial narrowing and a second, radial narrowing, the first, radial elevation and the first, radial narrowing being provided for forming a first press fit, and, respectively, the second, radial elevation and the second, radial narrowing being provided for forming a second press fit;
the shaft including a third, radial elevation and a fourth, radial elevation; and
a second inner ring fixable to the shaft including at least one second radially outer rolling element raceway for the rolling elements to roll on, a third, radial narrowing and a fourth, radial narrowing, the third, radial elevation and the third, radial narrowing being provided for forming a third press fit, and, respectively, the fourth, radial elevation and the fourth, radial narrowing being provided for forming a fourth press fit.

2. The rolling bearing as recited in claim 1 wherein the first outer diameter of the first, radial elevation is smaller than or equal to the second outer diameter of the second, radial elevation and the second outer diameter of the second, radial elevation is smaller than or equal to the third outer diameter of the third radial elevation and the third outer diameter of the third, radial elevation is smaller than or equal to the fourth outer diameter of the fourth, radial elevation.

3. The rolling bearing as recited in claim 2 wherein the first and the second outer diameters are equal in size to each other.

4. The rolling bearing as recited in claim 2 wherein the third and the fourth outer diameters are equal in size to each other.

5. The rolling bearing as recited in claim 1 wherein in the region of the first, second, third and fourth press fits, the shaft has a multi-piece configuration.

6. The rolling bearing as recited in claim 1 wherein the shaft merges, in the region of the first, second, third or fourth radial elevations, beginning from the first, second, third or, respectively, fourth outer diameter, in one axial direction, with a linear, concave or convex shape into a further region with a further outer diameter respectively smaller than the first, second, third and fourth outer diameter.

7. The rolling bearing as recited in claim 1 wherein the respective first or second inner ring merges in the region of the first, second, third or fourth radial narrowing, beginning from the first, second, third and, respectively, fourth inner diameter, in one axial direction, with a linear, concave or convex shape into a region with a further inner diameter that is respectively larger than the first, second, third and fourth inner diameter.

8. The rolling bearing as recited in claim 1 wherein a first axial distance of the first press fit from the second press fit is larger than half the axial width of the first inner ring or a second axial distance of the third press fit from the fourth press fit is larger than half the axial width of the second inner ring.

9. The rolling bearing as recited in claim 1 wherein the second press fit is arranged on one axial end of the first inner ring or the third press fit is arranged on one end of the second inner ring.

10. A rolling bearing as recited in claim 1 wherein the shaft is insertable into the first and second inner rings, arranged axially relative to each other, until one axial front end of the second inner ring comes to abut against a turbine-side axial stop to signalize an operable position of the shaft.

11. A turbocharger rolling bearing comprising the rolling bearing as recited in claim 1.

* * * * *